June 5, 1951     H. M. OGLE     2,555,992
MOTOR CONTROL SYSTEM
Filed Feb. 3, 1950
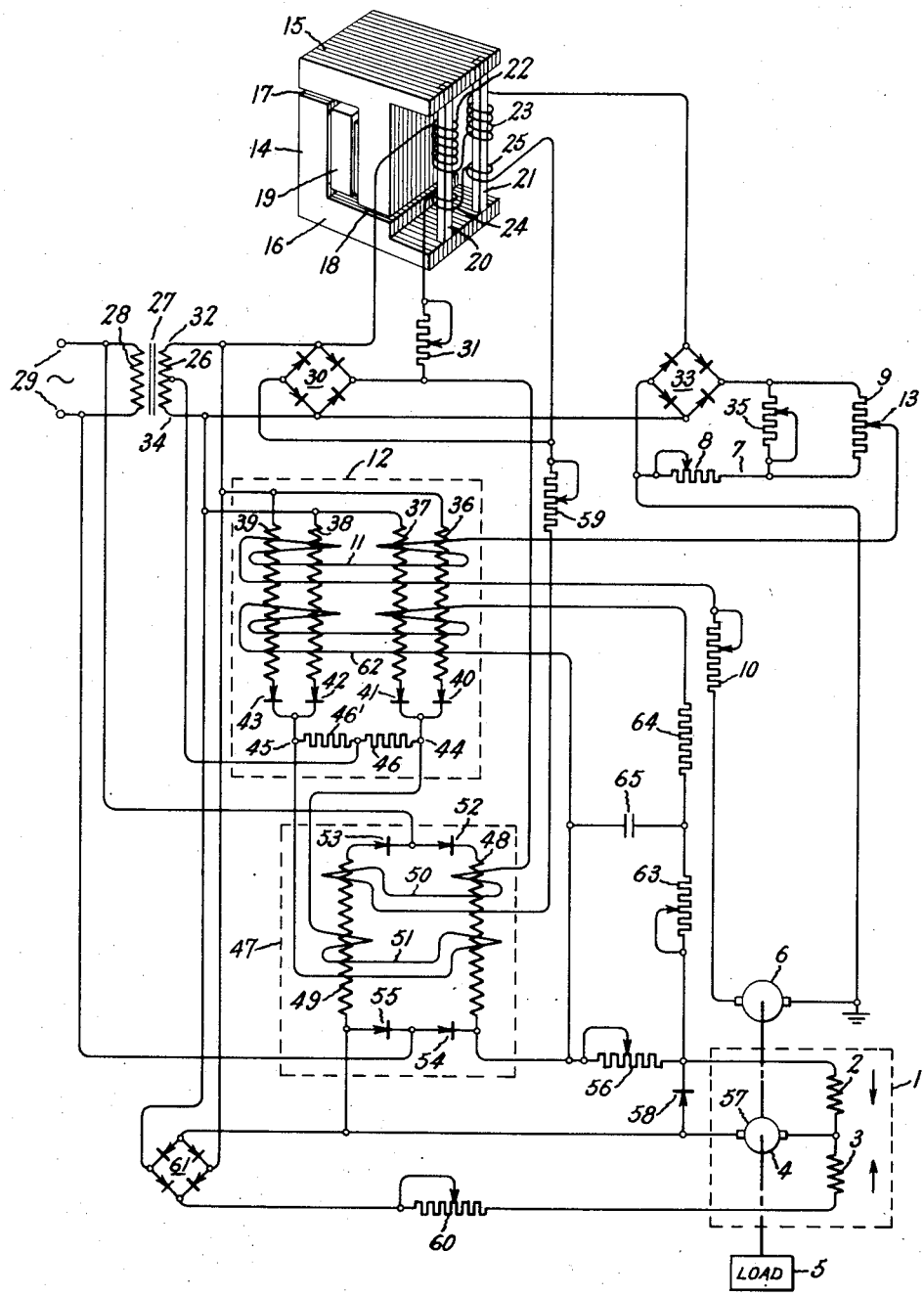
Inventor:
Hugh M. Ogle,
by Paul A. Frank
His Attorney.

Patented June 5, 1951

2,555,992

UNITED STATES PATENT OFFICE 2,555,992

MOTOR CONTROL SYSTEM

Hugh M. Ogle, Schenectady, N. Y., assignor to General Electric Company, a corporation of New York Application February 3, 1950, Serial No. 142,157

10 Claims. (Cl. 318—319)

My invention relates to motor control systems and, more particularly, to motor speed control systems which employ magnetic amplifiers in the control circuit.

In certain motor driven devices, such as in an aircraft camera drive, it is desirable to be able to vary the speed of the driving motor over a very wide range, and yet to be able to maintain an extremely constant speed at any particular speed setting. The construction of a motor speed control system having these desirable features is extremely difficult to accomplish, however, due to the limitations of speed variation inherent in conventional motor control arrangements as well as to the many uncontrollable parameters in such arrangements whose random variations alter the speed of the driving motor. An adjustable variation of regulated speed in the neighborhood of 8 to 1 has heretofore been considered a fairly wide range of adjustability.

A principal object of my invention, therefore, is to provide an improved motor speed control system which enables an adjustment of motor speed over an extremely wide range with a speed variation in the neighborhood of 200 to 1 and which maintains a substantially regulated motor speed at any desired speed setting within the range.

Another object of my invention is to provide a motor speed control system of high sensitivity and fast response such that the motor speed varies quickly and accurately in accordance with the adjustment of a primary control influence.

A further object of my invention is to provide a motor field excitation system which enables a large measure of speed control, good stability at low speeds, high starting torque, and dynamic braking action.

In general, my improved motor speed control system comprises a driving motor which is mechanically connected both to the load and to a generator whose output voltage varies in accordance with its speed. This generator output voltage is compared with a voltage produced at the adjustable tap of a voltage dividing network, and the difference between these two voltages is amplified magnetically and employed to control the power driving the motor. A constant current is maintained through the voltage dividing network with the result that a constant voltage is maintained at its adjustable tap. If, at any given speed setting, the motor tends to change its speed due, for example, to an increase in load, the difference voltage between the generator output voltage and the constant voltage at the adjustable tap, changes accordingly and compensates for this attempted speed variation. Consequently, the motor speed remains essentially constant at its initial speed setting.

The novel features which I believe to be characteristic of my invention, are set forth with particularity in the appended claims. My invention itself, however, together with further objects and advantages thereof can best be understood by reference to the following description taken in connection with the accompanying drawing in which the sole figure is a schematic circuit diagram of one form of a motor control system embodying my invention, and which includes a perspective view of a magnetic saturation device preferably employed in the motor control system. A physical representation of this magnetic saturation device is illustrated merely because there is no conventional diagrammatic symbol adequate to represent its complete mode of operation.

Referring to the drawing, a drive motor 1 has a pair of series connected field windings 2 and 3 and armature 4 mechanically connected both to a load, designated as block 5, and to a speed measuring means such as a tachometer generator 6. The tachometer generator 6 may be of any suitable known type which generates a voltage varying linearly with speed. One output terminal of the generator 6, which may be grounded, is connected to one side of a voltage dividing network 7, which may conveniently comprise a variable impedance 8 and a potentiometer 9, as indicated. The other output terminal of the tachometer generator 6 is connected through a sensitivity regulating impedance 10, preferably adjustable, to one end of a control winding 11 of a push-pull type of magnetic amplifier designated generally by the numeral 12. The other end of the control winding 11 is connected to an adjustable tap 13 of the potentiometer 9. It is, therefore, apparent that the voltage applied across the control winding 11 is the difference between the voltage developed between the grounded end of the voltage dividing network 7 and the adjustable tap 13 and the voltage developed between the adjustable tap of impedance 10 and the grounded terminal of the generator 6.

If a constant current is supplied through the voltage dividing network 7, this control voltage varies at any given setting of the adjustable tap 13 in accordance with the speed variations of the drive motor 1. In addition, by adjusting the variable impedance 8, the minimum voltage difference and consequently the minimum motor speed permitted by the adjustment of tap 13 may be controlled.

In order to maintain a constant current through the voltage dividing network 7, I preferably employ a current regulating circuit which utilizes a magnetic saturation device 14 as its current controlling device. This magnetic saturation device 14 comprises a main magnetic core member including a stack of T-shaped laminations 15 and a stack of L-shaped laminations 16 separated by small air gaps 17 and 18, as illustrated. A permanent magnet 19 is located between the extensions of the stacks 15 and 16 and arranged so that one pole is adjacent the extension of the T-shaped stack 15 while the other pole is adjacent the extension of the L-shaped stack 16. The flux from this permanent magnet, therefore, tends to bridge the gaps 17 and 18 in the magnetic circuit. Another pair of core members 20 and 21, each carrying a main winding and an auxiliary winding, extend between adjacent ends of the T and L-shaped stacks. The main control windings, designated by numerals 22 and 23 respectively, are connected in series but with their polarities reversed with respect to the direction of the uni-directional flux from the permanent magnet 19. The auxiliary windings, designated by numerals 24 and 25 respectively, are also connected in series but with their polarities in the same relative direction with respect to the uni-directional flux from the permanent magnet 19. The device 14 is so proportioned that the core legs 20 and 21 are saturated to a point considerably above the knee of saturation curve by only a small portion of the total flux of the magnet 19.

The constant current controlling circuit for the voltage dividing network 7 which utilizes this magnetic saturation device 14, is energized by the voltage developed across a secondary winding 26 of a power transformer 27 whose primary winding 28 is connected to any convenient source of alternating current 29. The secondary winding 26 is connected across the input terminals of a full wave bridge rectifier 30 whose direct current output terminals are connected in series circuit relation with a variable impedance 31 and the auxiliary windings 24 and 25. The main windings 22, 23 are also connected in series between one end 32 of the secondary winding 26 and an input terminal of a second full wave bridge rectifier 33 whose other input terminal is directly connected back to the other end 34 of the secondary winding 26. The voltage dividing network 7, comprising variable impedance 8 and potentiometer 9, is connected across the direct current output terminals of the rectifier 33 while a variable impedance 35 is preferably connected in parallel with potentiometer 9 in order to enable an adjustment of the current range of the potentiometer.

The operation of this above described constant current control system depends upon the effect of desaturation of each of the legs 20 and 21 during alternate half cycles of supply voltage due to the current flowing in the main windings 22 and 23. During each alternation this desaturation occurs after only a very slight increase in voltage and thereafter functions to prevent further changes in current for the remainder of the alternation. As a result, a distorted square type wave of current is produced in the main winding circuit whose amplitude is fairly constant and depends only upon the point of desaturation. Changes in the amplitude of the supply voltage merely vary the speed of approach to the desaturating point but do not substantially affect the amount of current passed. Additional voltage compensation is introduced, however, by the uni-directional current through the auxiliary windings 24 and 25 which are connected in suitable polarity with respect to the permanent magnet to cause a decrease of saturating magnetomotive force upon an increase in current therethrough. Thus, with a higher supply voltage, the point of desaturation is lowered to compensate for any tendency to pass more current.

The constant current regulating system described above forms the subject matter of U. S. application, Serial No. 68,543, filed in the name of Burnice D. Bedford on December 31, 1948, and assigned to the same assignee as the present invention. A detailed description and explanation of the operation of this constant current regulating system is disclosed in this Bedford application and a further explanation of the operation of this circuit, other than that appearing above, is, therefore, not considered to be necessary to a proper understanding of the present invention.

Referring now to the magnetic amplifier 12, two pairs of reactance windings 36, 37 and 38, 39 respectively, are preferably wound on legs of four, preferably separate, magnetic core members (not shown) and are connected to be energized by current derived from the secondary winding of transformer 27. One end of each reactance winding 36 and 39 is connected to one side 32 of the secondary winding 26, while corresponding ends of the reactance windings 37 and 38 are connected to the opposite side 34 of secondary winding 26. The other end of each reactance winding is connected to a respective one of four similarly poled rectifiers designated by the numerals 40, 41, 42, and 43. One pair of rectifiers 40 and 41 serve to complete a series circuit connection from one pair of reactance windings 36 and 37 respectively to a common output terminal 44, while a second pair of rectifiers 42 and 43 serve to complete a series circuit connection from the second pair of reactance windings 38 and 39 respectively to a second common output terminal 45. In order to provide a proper load impedance for the magnetic amplifier 12 as well as an alternating current return path for each pair of reactance windings, a pair of substantially identical impedances 46 and 46' are connected in series across the output terminals 44 and 45 with their common terminal directly connected to a center tap of the transformer secondary winding 26. It will thus be seen that during the supply voltage alternations of one polarity, such as positive, current flows through reactance windings 36 and 39, and that during the supply voltage alternations of opposite polarity, current flows through reactance windings 37 and 38. Since each reactance winding of these latter pairs of reactance windings are connected through similar impedances to opposite output terminals 44 and 45 respectively, the output voltage produced across these output terminals depend upon the differential of the currents passed by the reactance windings in each pair. If, for example, reactance windings 36 and 39, pass equal currents during positive half cycles and reactance windings 37 and 38 pass equal currents during negative half cycles, then equal voltages are developed at the output terminals 44 and 45, and no differential output voltage exists to drive the output circuit. If, however, reactance winding 36 passes a greater current than winding 39 during its half cycle of conduction while reactance winding 37 passes a greater current than winding 38 during its conducting half cycles, then a push-pull action results whereby a greater voltage is developed at output terminal 44 than at terminal 45. Consequently, current flows in the output circuit in a direction from terminal 44 to terminal 45. Conversely, a preponderance of conduction through reactance windings 38 and 39 over reactance windings 36 and 37 causes a greater voltage at terminal 45 than at terminal 44 to produce an output circuit current which flows in an opposite direction.

This variation of the preponderance of current through reactance windings 36 and 37 with respect to reactance windings 38 and 39 during their respective half cycles of conduction is controlled by the differential voltage supplied to the control winding 11 from the voltage dividing network 7 and from the tachometer generator 6 as explained hereinbefore. The control winding 11 is wound and connected so that the control flux produced in the magnetic core members is in one direction with respect to the flux produced by the reactance windings 36 and 37, but is in an opposite direction with respect to the flux produced by the reactance windings 38 and 39. Due to the similarly poled rectifiers 40 and 41, 42 and 43, current flows in the same direction through all of the reactance windings 36, 37, 38, and 39 and the control flux hastens the saturation of one of these pairs of reactance windings while it retards the saturation caused by the other pair of reactance windings. A reversal of current in the control winding 11 merely reverses the above control action with the result that the polarity of the output voltage depends upon the direction of current through the control winding 11 while the amplitude of the output voltage depends upon the voltage difference between the voltage at the adjustable tap 13 of the potentiometer 9 and the output voltage of the tachometer generator 6.

The output voltage of this first stage of magnetic amplification is used to control a power stage of magnetic amplification comprising a bridge type magnetic amplifier 47 which includes a core member (not shown) having a pair of reactance windings 48 and 49, a bias winding 50 and a control winding 51. The reactance windings 48 and 49 each have one end connected through one of a pair of reversely poled rectifiers 52 and 53 to one side of the alternating current source 29. The other ends of the reactance windings 48 and 49 are similarly connected through a second pair of reversely poled rectifiers 54 and 55 to the other side of the alternating current source 29. A load circuit comprising a variable impedance 56, the field winding 2 which produces the speed controlling field and an armature winding 57 of the motor 1, is connected in series circuit relation across one pair of adjacent ends of the reactance windings 48 and 49. A commutating rectifier 58 is also preferably connected across the motor 1 to by-pass any reverse current due to inductance in the motor. The control winding 51 is directly connected across the output terminals 44 and 45 of the first stage of magnetic amplification while the bias winding 50 is connected to any suitable source of uni-directional biasing voltage such as that produced at the output terminals of the bridge rectifier 30. A bias voltage controlling impedance 59 is preferably also included in series circuit relation with the biasing circuit.

Due to the bridge type connection of this magnetic amplifier 47, current flows through each reactance winding of the amplifier during alternate half cycles of supply voltage. The flux in each reactance winding returns during its period of non-conduction to a normal operating flux level which is determined by the flux due to the current in the bias winding 50. As is well-known, the magnitude of this biasing flux determines the time of saturation of the magnetic core during each alternation and, therefore, controls the normal amount of output voltage supplied to the load. When a signal voltage is applied to the control winding 51, however, the control winding flux either aids or opposes the biasing flux depending upon the direction of current in the control winding. As a consequence, the output voltage is either increased or decreased depending upon the polarity of signal voltage, while the absolute magnitude of the output voltage varies in accordance with the amplitude of this signal voltage.

The other field winding 3 of the motor 1 which will hereafter be referred to as a "stabilizing winding" is also connected in series circuit relation with the motor armature 57 and is supplied with a substantially constant voltage by a connection through a variable impedance 60 to the direct current output terminals of another full wave bridge rectifier 61. The alternating current input terminals of this rectifier 61 may be connected across the secondary winding 26 of the transformer 27 as illustrated. The direction of current through this stabilizing winding 3 is such that the field produced by the stabilizing winding 3 produces a flux which is in opposition to the flux produced by the speed controlling field winding 2. Since the armature winding 57 is in series with both circuits, however, the armature current comprises the sum of the currents flowing through each field winding 2 and 3. An increase in the output current from the magnetic amplifier through the speed control field winding 2 will, therefore, cause an increase in total armature current as well as an increase in the total field flux. The flux opposition of the field produced by the stabilizing winding 3 functions to provide a greater measure of stability, speed control and dynamic braking action, as will be more fully explained hereinafter.

In order to increase the sensitivity of the regulating system further, I provide regenerative feed back of the voltage developed across the impedance 56 to a second control winding 62 of the first magnetic amplifier 12. This second control winding 62 is wound with respect to the reactance windings 36, 37, 38 and 39 in the same manner as the first control winding 11. In addition, a delay network is included to lessen the speed of response of this regenerative circuit in order to prevent a "hunting" action of the motor speed. This delay network preferably comprises a variable impedance 63 and a fixed impedance 64 connected in series from one side of the impedance 56 to one end of the control winding 62 and a capacitor 65 connected from the common terminals of impedances 63, 64 to the opposite end of control winding 62.

In order to understand the operation of the above described motor control system, assume that the initial speed of the motor 1 is such that the voltage supplied to one side of control winding 11 of magnetic amplifier 12 by generator 6 is equal to the voltage supplied to the other side of control winding 11 from the voltage dividing network 7. If tap 13 of potentiometer 9 is now adjusted to a lower voltage position, a current flows through control winding 11 which causes one pair of reactance windings, such as windings 36 and 37 to pass more current during their conducting periods than the other pair of reactance windings 38 and 39. A differential voltage is, therefore, produced across output terminals 44 and 45 of the magnetic amplifier 12 which causes a current flow in the control winding 51 of power stage magnetic amplifier 47. The direction of current flow in control winding 51 is such that the control flux in the magnetic core opposes the flux produced therein by the bias winding 50 and thereby retards the saturation of the core by the current flowing through the reactance windings 48 and 49. Consequently, the voltage supplied to the motor 1 is reduced, and the motor speed lessened. This reduction of motor speed will, of course, continue until the difference voltage applied across the control winding of amplifier 12 is reduced to a small amount. Any subsequent tendency toward change in speed of the motor 1 from this new reduced speed setting, such as may be produced by a change in mechanical load, will, of course, be compensated by a similar train of events. If, for example, the motor speed tends to increase due to a lightening of the mechanical load, a voltage difference is applied across control winding 11 whose polarity is the same as that of the previously described voltage difference produced by an adjustment of tap 13 to a lower voltage position. The output voltage of the power stage magnetic amplifier 47 is therefore further reduced to compensate for this lightening of the load.

The overall sensitivity of the regulating system may be controlled by adjustment of impedance 10 until sufficient voltage change is applied across the control winding 11 by a change in speed of the tachometer generator 6 to compensate for any contemplated load variations upon the generator at any speed setting. The general level of motor controlling voltage may be adjusted by variation of bias controlling impedance 59 while the minimum speed of the motor may be controlled by adjustment of variable impedance 8. The amount of feedback voltage supplied to the second control winding 62 of magnetic amplifier 12 may also be adjusted by variation of impedance 56 to give the desired speed of response of the compensating action, while the time delay network in the feedback circuit may be adjusted by varying impedance 63 to prevent too great an acceleration of the motor which may cause overcompensation and a consequent hunting action.

One of the important features of my invention is the use of a motor with a split series-connected field winding rather than a motor of the shunt or compound field winding type. Although a series motor has high starting torque and permits a very wide range of speed variation with a relatively small change in control voltage, such motors are not normally employed in constant speed control systems because of their very poor speed regulation characteristics. A slight increase in mechanical load, for example, causes both a decrease in counter electromotive force and an increase in field strength. Since the speed of a motor varies directly with the counter electromotive force and inversely with the field strength, a very pronounced reduction of speed results. I have found, however, that by employing a closed loop regulating system, such as described above, which has a large amount of error voltage amplification and a large amount of regenerative feedback, the speed can be maintained extremely constant regardless of normal changes in load, and the desired high starting torque and wide range of speed control can be preserved. By this arrangement a speed variation as large as 300 to 1 has been obtained with good speed regulation at any desired speed setting.

In addition, by employing a series connected stabilizing field winding which is energized to produce a magnetic field of lesser intensity and in opposition to the main series field produced by the speed regulating control winding, I derive many additional advantages. At low speeds the field due to the speed control field winding 2 is only slightly greater than the field due to the stabilizing winding and the current flowing in armature winding 57 is the total of the current flowing in both field windings 2 and 3. Thus, motor 1 operates at low speeds with a higher armature current and a lower field strength than in the conventional series motor. This higher armature current impresses a greater proportion of the line voltage across the armature and thereby reduces the instability of the motor at low speeds due to voltage losses across the brushes. At high speeds however, the speed control winding field is much greater than the stabilizing field and the generated counter-electromotive force tends to completely remove the effect of the stabilizing field. As a result, the stabilizing field improves the stability of the motor at low speeds but does not interfere with the range of speed control of the motor by the output voltage of the magnetic amplifiers at higher speeds.

In addition, at low speeds, the field due to the stabilizing winding tends to counteract the effect of indeterminate speed variation due to residual magnetism in the motor armature and thereby provides a more positive speed control. Furthermore, the additional stabilizing field introduces a dynamic braking action since any tendency of the motor to coast upon a sudden reduction in voltage output of the magnetic amplifier is counteracted by the presence of the stabilizing field which quickly reduces the speed of the motor to the new reduced speed setting.

It is to be understood that while I have shown a particular embodiment of my invention, many modifications can be made; and I, therefore, intend by the appended claims to cover all such modifications as fall within the true spirit and scope of my invention.

What I claim as new and desire to secure by Letters Patent of the United States is:

1. A motor speed regulating system comprising a motor having a series connected field winding, speed measuring means connected to said motor for providing a measured voltage varying in accordance with the speed of said motor, a source of substantially constant voltage, a first magnetic amplifier having a control winding connected to receive the voltage difference between said substantially constant voltage and said measured voltage for providing a first amplified output voltage which varies in accordance with the amplitude and polarity of said voltage difference, and a second magnetic amplifier having a control winding connected to receive the amplified output voltage of said first magnetic amplifier for providing a uni-directional output voltage from said second magnetic amplifier having amplified voltage variations responsive to the voltage variations of said measured voltage but in opposite sense therewith, said motor being connected to be energized by the uni-directional output voltage of said second magnetic amplifier.

2. A motor speed controlling and regulating system comprising a motor having a series connected field winding, a generator driven by said motor for providing a generated voltage varying in accordance with the speed of said motor, a voltage dividing network connected to provide a substantially constant voltage adjustable in magnitude, a first magnetic amplifier having a control winding connected to receive the voltage difference between said substantially constant voltage and said generated voltage for providing a first amplified output voltage which varies in accordance with the amplitude and polarity of said voltage difference, and a second magnetic amplifier having a control winding connected to receive the amplified output voltage of said first magnetic amplifier for providing a uni-directional output voltage from said second magnetic amplifier having amplified voltage variations responsive to the voltage variations of said generated voltage but in opposite sense therewith, said motor being connected to be energized by the uni-directional output voltage of said second magnetic amplifier.

3. A motor speed regulating system comprising a motor, speed measuring means connected to said motor for providing a measured voltage varying in accordance with the speed of said motor, a source of substantially constant voltage, magnetic amplifying means having an input control winding connected to be energized by the voltage difference between said substantially constant voltage and said generated voltage for producing a uni-directional output voltage from said amplifying means having amplified voltage variations responsive to the voltage variations of said measured voltage but in opposite sense therewith, said motor being connected to be energized by the uni-directional output voltage of said amplifying means, and means connected in circuit relation with said uni-directional output voltage to feed back regeneratively a fraction of said uni-directional output voltage to the input of said magnetic amplifying means.

4. A motor speed regulating system comprising a motor having a series connected field winding, a generator driven by said motor for providing a generated voltage varying in accordance with the speed of said motor, a source of substantially constant voltage, a first magnetic amplifier having a control winding connected to receive the voltage difference between said substantially constant voltage and said generated voltage for providing a first amplified output voltage which varies in accordance with the amplitude and polarity of said voltage difference, a second magnetic amplifier having a control winding connected to receive the amplified output voltage of said first magnetic amplifier for providing a uni-directional output voltage from said second magnetic amplifier having amplified voltage variations responsive to the voltage variations of said generated voltage but in opposite sense therewith, said motor being connected to be energized by the uni-directional output voltage of said second magnetic amplifier, and means including a voltage time delay network connected in circuit relation with said uni-directional output voltage to feed back regeneratively a fraction of said uni-directional output voltage to the input of said first magnetic amplifier.

5. A motor speed controlling and regulating system comprising a motor, a generator driven by said motor for providing a generated voltage varying in accordance with the speed of said motor, voltage dividing means for providing a substantially constant voltage adjustable in magnitude, a first magnetic amplifier having a control winding connected to receive the voltage difference between said substantially constant voltage and said generating voltage for providing a first amplified voltage which varies in accordance with the amplitude and polarity of said voltage difference, a second magnetic amplifier having a control winding connected to receive the output voltage of said first magnetic amplifier for producing a uni-directional output voltage from said amplifying means having amplified voltage variations responsive to the voltage variations of said generated voltage but in opposite sense therewith, said motor being connected to be energized by the uni-directional output voltage of said amplifying means, means including a bias control winding of said second magnetic amplifier for controlling the voltage level of said uni-directional output voltage, and means connected in circuit relation with said uni-directional output voltage to feed back regeneratively a fraction of said uni-directional output voltage to said first magnetic amplifier.

6. A motor speed regulating system comprising a motor, speed measuring means connected to said motor for providing a measured voltage varying in accordance with the speed of said motor, a voltage dividing network, means including a magnetic saturation device for maintaining a substantially constant current through said voltage dividing network to produce a substantially constant output voltage from said voltage dividing network which is adjustable in magnitude, and magnetic amplifying means having an input control winding connected to be energized by the voltage difference between said substantially constant voltage and said measured voltage for producing a uni-directional output voltage from said amplifying means having amplified voltage variations responsive to the voltage variations of said measured voltage but in opposite sense therewith, said motor being connected to be energized by the uni-directional output voltage of said amplifying means.

7. A motor speed control system comprising a first source of uni-directional voltage adjustable in magnitude, a motor having an armature winding, a speed control field winding and a stabilizing field winding, said speed control winding and said stabilizing field winding each having one end connected to the same end of said armature winding, said speed control winding and said armature winding being connected in series circuit relation with said first source of uni-directional voltage, and a second source of substantially constant uni-directional voltage connected in series circuit relation with said armature winding and said stabilizing field winding to produce a current in said armature winding in the same direction as the current produced therein by said first source of unidirectional voltage and to produce a field from said stabilizing winding in flux opposition to the field from said speed control winding.

8. A motor speed regulating system comprising, a motor having an armature winding, a control field winding and a stabilizing field winding, said control field winding and said stabilizing field winding each having one end connected independently to the same end of said armature winding, speed measuring means connected to said motor for providing a generated voltage varying in accordance with the speed of said motor, a first source of substantially constant voltage, magnetic amplifying means having an input control winding connected to be energized by the voltage difference between said substantially constant voltage and said measured voltage for producing a uni-directional output voltage from said amplifying means having amplified voltage variations responsive to the voltage variations of said measured voltage but in opposite sense therewith, said armature winding and said control field winding being connected in series circuit relation with said output voltage of said amplifying means, and a second source of substantially constant voltage connected in series circuit relation with said armature winding and said stabilizing field winding to produce a current in said armature winding in the same direction as the current produced therein by said output voltage of said amplifying means and to produce a field from said stabilizing winding in flux opposition to the field from said control winding.

9. A motor speed controlling and regulating system comprising a motor having an armature winding a control field winding and a stabilizing field winding, said control field winding and said stabilizing field winding as having one end connected to the same end of said armature winding, a generator driven by said motor, a first source of substantially constant voltage adjustable in magnitude, a first magnetic amplifier having a control winding connected to receive the voltage difference between said substantially constant voltage and said generated voltage for providing a first amplified output voltage which varies in accordance with the amplitude and polarity of said voltage difference, a second magnetic amplifier having a control winding connected to receive the amplified output voltage of said first magnetic amplifier for providing a uni-directional output voltage from said second magnetic amplifier having amplified voltage variations responsive to the voltage variations of said generated voltage but in opposite sense therewith, said armature winding and said control field winding being connected to be energized by the uni-directional output voltage of said second magnetic amplifier, and a second source of substantially constant voltage to produce a current in said armature winding in the same direction as the current produced therein by the output voltage of said second magnetic amplifier.

10. A motor speed regulating system comprising, a motor having an armature winding, a control field winding and a stabilizing field winding, said control field winding and said stabilizing field winding each having one end connected independently to the same end of said armature winding, a generator driven by said motor for providing a generated voltage varying in accordance with the speed of said motor, a first source of substantially constant voltage, magnetic amplifying means having an input control winding connected to be energized by the voltage difference between said substantially constant voltage and said generated voltage for producing a uni-directional output voltage from said amplifying means having amplified voltage variations responsive to the voltage variations of said generated voltage but in opposite sense therewith, said armature winding and said control field winding being connected in series circuit relation with said output voltage of said amplifying means, impedance means associated with said series circuit for regeneratively feeding back a fraction of said uni-directional output voltage to the input of said magnetic amplifying means, and a second source of substantially constant voltage connected in series circuit relation with said armature winding and said stabilizing field winding to produce a current in said armature winding in the same direction as the current produced therein by said output voltage of said amplifying means and to produce a field from said stabilizing winding in flux opposition to the field from said control winding.

HUGH M. OGLE.

REFERENCES CITED

The following references are of record in the file of this patent:

UNITED STATES PATENTS

| Number | Name | Date |
|---|---|---|
| 1,426,123 | Stoekle | Aug. 15, 1922 |
| 1,640,002 | Latour | Aug. 23, 1927 |
| 2,384,865 | Wickerham | Sept. 18, 1945 |
| 2,414,936 | Edwards et al. | Jan. 28, 1947 |
| 2,462,751 | Koehler | Feb. 22, 1949 |